March 31, 1970   H. J. DONELSON, JR   3,503,502
PARTICULATE MATERIAL CLEANER
Filed Sept. 26, 1968

INVENTOR
HARLAN J. DONELSON, JR.
BY
Zarley, McKee & Thomte
ATTORNEYS

March 31, 1970  H. J. DONELSON, JR  3,503,502
PARTICULATE MATERIAL CLEANER
Filed Sept. 26, 1968  2 Sheets-Sheet 2
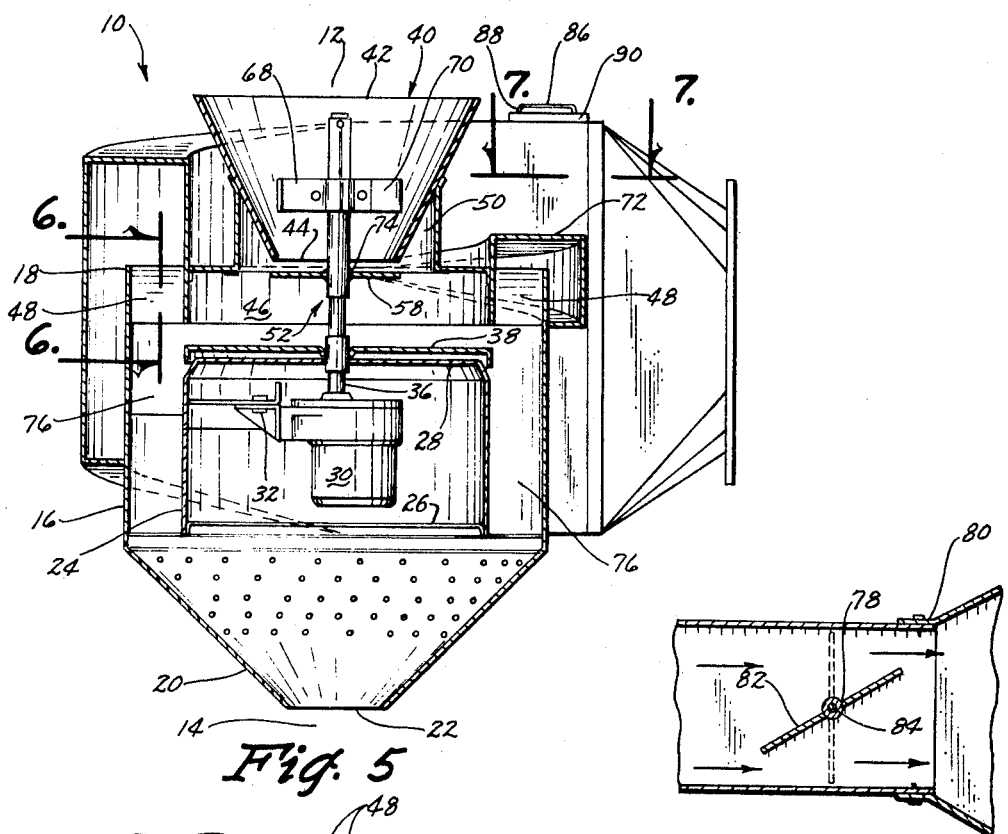
Fig. 5
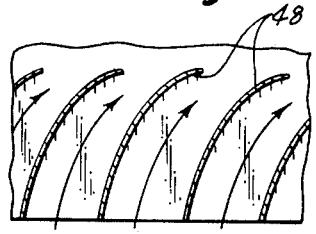
Fig. 6
Fig. 7
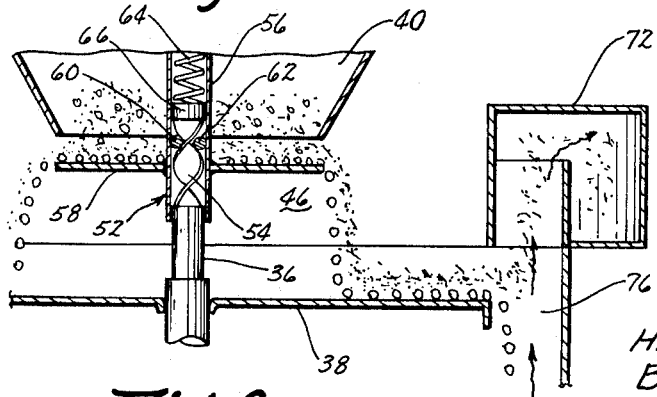
Fig. 8
INVENTOR
HARLAN J. DONELSON, JR.
BY
Zarley, McKee & Thomte
ATTORNEYS United States Patent Office 3,503,502
Patented Mar. 31, 1970

3,503,502
PARTICULATE MATERIAL CLEANER
Harlan J. Donelson, Jr., West Highway 330,
Marshalltown, Iowa 50158
Filed Sept. 26, 1968, Ser. No. 762,714
Int. Cl. B07b 4/00
U.S. Cl. 209—139                                9 Claims

ABSTRACT OF THE DISCLOSURE

A cleaner for particulate material such as grain or the like and including a hopper means having a material intake opening at its upper end and a discharge opening at its lower end. A housing with a turntable is positioned below the hopper and has an air passageway formed therein which is adapted to permit the upward flow of air therethrough. A fan means is in operative communication with the air passageway and is adapted to pull air upwardly through the air passageway. The discharge opening of the hopper means is in communication with the air passageway whereby material deposited in the hopper means will be directed to the air passageway so that the air moving upwardly through the air passageway will separate the debris from the desirable material. A spiral conduit extends around the housing and is in communication with the air passageway and is adapted to receive the debris from the air passageway and to convey it to an area outside of the cleaner.

Conventional material cleaners such as grain cleaners or the like unless extremely large, do not permit an adequate volume of material to be cleaned. Additionally, the conventional material cleaners such as grain cleaners or the like are quite cumbersome, expensive to manufacture and inefficient in operation. The conventional grain cleaners for example do not satisfactorily separate the debris such as chaff or the like from the grain.

Therefore, it is a principal object of this invention to provide a material cleaner for particulate materials such as grain or the like.

A further object of this invention is to provide a material cleaner which is efficient in operation.

A further object of this invention is to provide a material cleaner which is compact.

A further object of this invention is to provide a material cleaner which cleans a large volume of material but yet is very compact.

A further object of this invention is to provide a material cleaner which utilizes a rotatable turntable which aids in the cleaning of the material by centrifugal force produced thereby.

A further object of this invention is to provide a material cleaner which is especially well adapted for use with a dust collector or the like.

A further object of this invention is to provide a material cleaner which may be used in conjunction with a bin, wagon or any other type of receptacle.

A further object of this invention is to provide a material cleaner having a flow control means associated therewith.

A still further object of this invention is to provide a material cleaner which is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 5 is an enlarged sectional view as seen along line 5—5 of FIG. 3;

FIG. 6 is an enlarged sectional view as seen along line 6—6 of FIG. 5;

FIG. 7 is an enlarged sectional view as seen along line 7—7 of FIG. 5; and

FIG. 8 is a fragmentary sectional view of the flow control means, turntable and spiral conduit.

Figure 1:
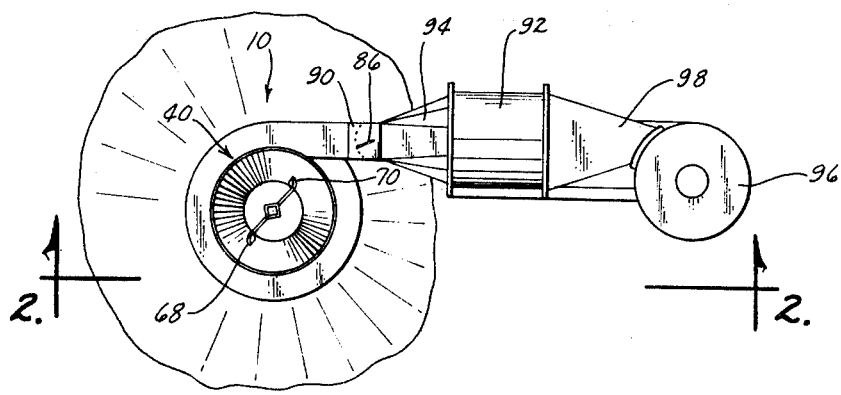
FIG. 1 is a top view of the device which is mounted in the upper end of a storage bin which is partially illustrated.

The material cleaner of this invention is generally designated by the reference numeral 10 and includes an upper end 12 and lower end 14. The numeral 16 refers to a hollow cylinder having an upper end 18 and a frusto-conical shaped member 20 extending downwardly and inwardly from the lower end thereof. Member 20 is perforated (FIG. 5) to permit air to flow upwardly therethrough as will be explained later. Member 20 is also provided with a central discharge opening 22 formed at the lower end thereof as also best illustrated in FIG. 5. A hollow housing member 24 is suitably mounted in cylinder 16 and has a closed bottom 26 and top 28. An electric motor 30 or the like is mounted in housing member 24 by means of bracket 32 and has a power shaft 36 rotatably extending upwardly through top 28 of housing member 24.

A rotatable turntable 38 is mounted on shaft 36 by any convenient means for rotation therewith above top 28 of housing member 24. A hopper means 40 is provided at the upper end of the material cleaner 10 and has a material intake opening 42 at its upper end and a material discharge opening 44 at its lower end. A collar 46 of uniform height is positioned within the upper periphery of cylinder 16 and a plurality of air directing vanes 48 are positioned between the outer surface of collar 46 and the inner surface of the upper end of cylinder 16. Hopper 40 is connected to the collar 46 and is supported thereby by brackets 50 extending therebetween as best illustrated in FIG. 5. The numeral 52 generally designates a flow control means which is disclosed in applicant's United States Letters Patent No. 3,045,840 which issued on July 24, 1968. The upper end portion of the shaft 36 is formed into a spiral auger portion 54. Slidably mounted on the upper portion of the shaft 36 is an elongated member 56. This elongated member 56 extends upwardly within the center area of the hopper 40 and has on its lower portion a horizontal radial plate 58 positioned below the bottom open end of the hopper 40 as illustrated in FIG. 5. The numerals 60 and 62 designate two parallel spaced apart fingers extending through the elongated member 56 and engaging each side respectively of the auger portion 54 of the shaft 36 as shown in FIG. 5. By the arrangement of parts, any relative rotation between the elongated member 56 and shaft 36 will cause plate 58 to either move upwardly or downwardly depending upon the direction of its relative rotation to the shaft 36. Normally, however, the elongated member 56 will be held in an elevated position as shown in FIG. 5 by coiled spring 64 inside the upper end portion of the elongated member 56. The spring 64 has its upper end operatively connected to the elongated member 56 and its lower end yieldably engaging the top of the shaft 36. Therefore, the coil spring 64 will yieldingly cause the elongated member 56 to rotate clockwise relative to the shaft 36 and move upwardly until the fingers 60 and 62 engage the top head 66 of the shaft 36. The elongated member 56 supports two vertically adjustable material engaging arms 68 and 70. The arrangement of the components just described will cause the material to pass from the hopper 40 onto the spinning control plate 58 and from the plate 58 the material will be cast downwardly and outwardly to the turntable 38. If a great amount of material exists within the hopper 40 at any one time, the resistance bar arms 68 and 70 will engage the mass of material and will tend to slow down the rotation of the elongated member 56 relative to the shaft 36 which will cause the elongated member 56 and control plate 58 to move downwardly relative to the hopper 40 and permit a greater amount of material to pass by the control plate 58. As soon as the excess amount of material in the hopper 40 has been disposed of, the resistance to the rotation of the arms 68 and 70 will be lessened accordingly and the spring 64 will cause the rotation of the elongated member 56 and plate 58 relative to the shaft 36 and the plate 58 will move upwardly to reduce the distance between the lower end of the hopper 40 and the plate 58.

The numeral 72 generally designates a spiral conduit which begins at point 74 and which extends around the cylinder 16 as illustrated in the drawings. At point 74, conduit 72 has a zero thickness and increases in depth both upwardly and downwardly as the conduit extends around the cylinder 16. As seen in FIG. 5, the interior of conduit 72 is in communication with the upper end of the air passageway 76 which is defined between the of the cylinder 16 and the housing member 24 as illustrated in the drawings. A draft control means 78 is mounted in the discharge end 80 of the spiral conduit 72 and includes a pivotal gate 82 which is mounted on a rod 84. The upper end of rod 84 includes an arcuate handle portion 86 which is movable to control the rotation of the gate 82 to increase or decrease the amount of air passing through the spiral conduit 72. The handle 86 is provided with an arcuate end portion 88 which may be positioned in a plurality of detent openings 90 to maintain the gate 82 in various positions of its rotation with respect to the conduit 72.

Figure 2:
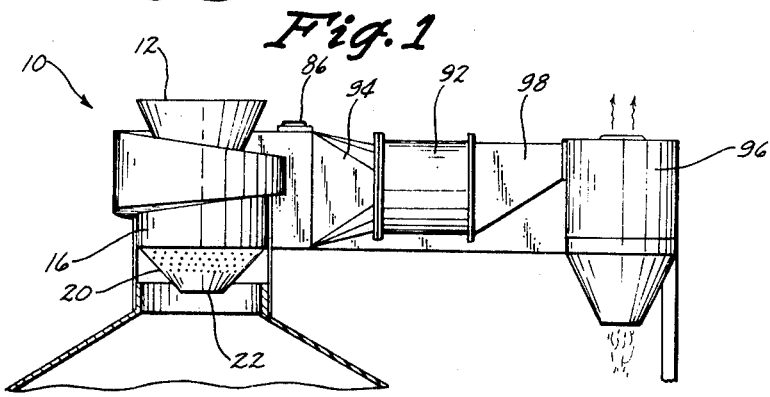
FIG. 2 is an elevational view of the device mounted in the upper end of a storage bin.
Figure 3:
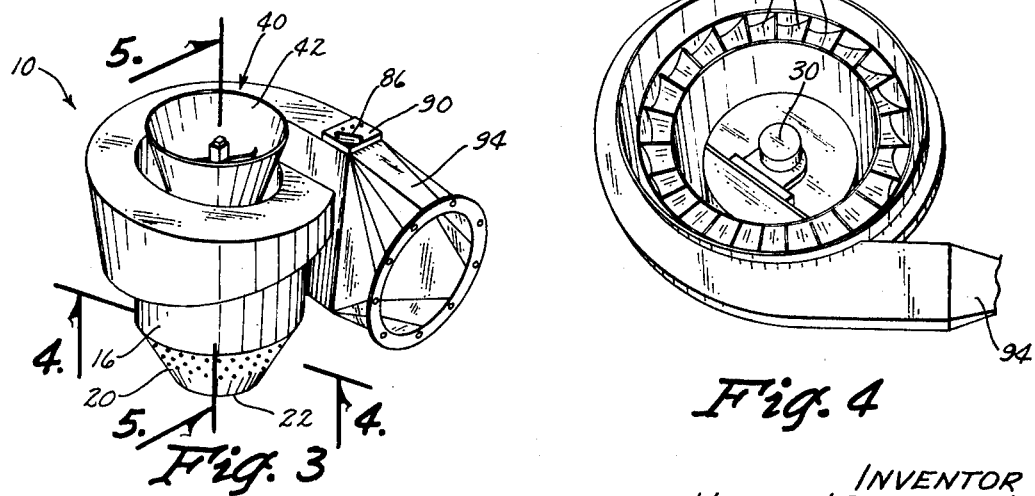
FIG. 3 is a top perspective view of the cleaner without the fan means being secured thereto.
Figure 4:
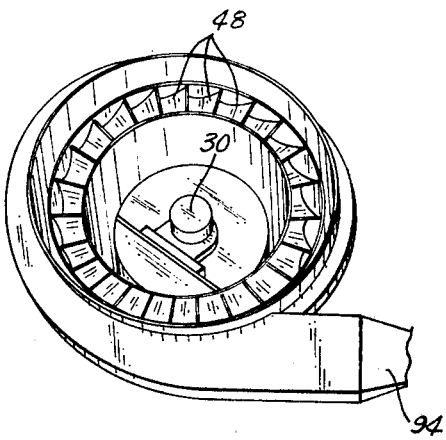
FIG. 4 is a bottom perspective view as seen along line 4—4 of FIG. 3.

The numeral 92 generally designates an electrically powered fan means which is secured to the outer end of the spiral conduit 72 by an auxiliary conduit 94 as illustrated in FIGS. 1 and 2. Fan means 92 is adapted to draw air from the lower end of the cleaner through the perforations in the member 20, upwardly through the air passageway 76 and into the spiral conduit 72. The fan means 92 is connected to a conventional cyclone dust collector 96 by an exhaust conduit 98 as best illustrated in FIGS. 1 and 2. The dust collector 96 may be advantageous in certain situations where it is desirable to collect the dust without putting an undue amount of back pressure on the fan means 92. It should be noted that while the drawings illustrate the preferred structural embodiment, the dust collector need not be used but it is preferred that the dust collector be utilized. Likewise, the fan means 92 is located in its most desirable position but it should be noted that the fan means could be replaced by a suitable means positioned below the grain cleaner which would exhaust air upwardly through the perforations formed in the member 20.

In operation, the motor 30 is started to cause the rotation of the turntable 38 and the fan motor of the fan means 92 is also started to cause a flow of air to be drawn upwardly through the perforations in the member 20, into the air passageway 76, spiral conduit 72, auxiliary conduit 94 and into the fan means 92 where it is then exhausted into the exhaust conduit 98 and the dust collector 96. The material to be cleaned is deposited in the upper end of the hopper means 40 and the flow control means 52 functions as previously described to supply a uniform curtain of material to the rotating turntable 38. The heavier material migrates towards each of the bottom of the members 58 and 38 by virtue of centrifugal force and the lighter debris migrates to the top of the material. Thus, the centrifugal force of acting on the material on the plate 58 and turntable 38 creates some separation of the debris from the remaining desirable material. The material and debris are uniformly forced from the outer periphery of the turntable 38 downwardly and outwardly in a uniform cylindrical curtain into the air passageway 76 which surrounds the space outside of the cylinder 24. The fan means 92 pulls the air upwardly through the perforations in the member 20, thence upwardly through passageway 76, thence upwardly through the air directing vanes 48 and thence into the inner convolution of the spiral conduit 72. The presence of grain in the hopper 40 seals the hopper and prevents the flow of air downwardly therethrough. The upper movement of the air through the material in the passageway 76 catches the lightweight debris and forces it into the conduit 72, thence through the fan means 92, and thence into the dust collector 96 or other suitable receptable. The velocity of the air through the conduit 72 is adjusted by the draft control means 78. The bottoms of the curved air directing vanes are in a flat plane and are designed to prevent undesirable air turbulence within the cleaner and to enhance the flow of air through the conduit 72. The configuration of the spiral conduit 72 is such that the conduit makes one complete revolution and goes from a zero thickness to its maximum thickness at its end 80 to achieve the maximum efficiency of air flow.

The cleaner disclosed herein eliminates the need for screens or filters which would ordinarily have to be constantly maintained and permits a large amount of material to be cleaned while still maintaining a compact unit. The cleaner may be used to clean any particulate material but it is especially well suited for grain cleaning such as corn or the like. Thus, it can be seen that the cleaner accomplishes at least all of its stated objectives.

I claim:

1. In a material cleaner,
 a housing means having a material intake opening at its upper end and a material discharge opening at its lower end, said housing comprising, a first hollow cylindrical housing member having open upper and lower ends, a second cylindrical housing member positioned in said first housing member and having its upper end positioned in a plane below the upper end of said first housing member upper end,
 said first and second housing members defining an air passageway therebetween,
 a powered rotatable turntable mounted above said second housing member below the upper end of said first housing member,
 a spiral conduit extending around said first housing member and having its interior in communication with the open upper end of first housing member and said air passageway, said spiral conduit having a discharge end adapted to be in communication with an area outside of said cleaner, said spiral conduit progressively increasing in depth in both an upwardly and downwardly direction as it progresses around said first housing member,
 means drawing air upwardly through said air passageway,
 means directing material deposited in said intake opening onto said turntable whereby said turntable will centrifugally force material deposited thereon towards the periphery thereof into said air passageway and whereby the heavier particles of said material migrates towards the bottom of the material on said rotating turntable thereby creating some separation of the debris from the desirable material prior to it being forced into said air passageway.

2. The cleaner of claim 1 wherein said rotating turntable is flat and has a diameter substantially equal to the diameter of said second housing member.

3. The cleaner of claim 1 including a hopper means at the material intake opening of said housing means, and wherein said directing means comprises a power means mounted in said second housing member, said power means having a power shaft rotatably extending upwardly through said second housing, member and being connected to said turntable means, said power shaft extending upwardly into said hopper means, said power shaft having a rotatable flow control means mounted thereon adapted to adjustable close the discharge opening of said hopper means, said flow control means and the material in said hopper means sealing said intake opening so that all air moving upwardly in said air passageway will be directed into said spiral conduit.

4. The cleaner of claim 3 wherein said flow control means includes a vertically movable plate means mounted on said power shaft below said hopper means for selectively closing the discharge opening thereof, said flow control means including an arm means extending laterally therefrom in said hopper means.

5. The cleaner of claim 1 wherein an inverted frustoconical shaped and perforated housing portion extends downwardly from the lower end of said first housing member.

6. The cleaner of claim 1 wherein a plurality of air deflection vanes are positioned in the upper end of said air passageway adapted to deflect the air passing therethrough upwardly into said spiral conduit, said air deflection vanes being curved so as to deflect the air and debris carried thereby towards the discharge end of the spiral conduit.

7. The cleaner of claim 1 wherein the upper end of said first housing member extends into said spiral conduit, said spiral conduit having an inner wall partially extending downwardly into the interior of said first housing member, said spiral conduit having an outer wall extending around said first housing member in a spaced relationship with respect thereto which progressively increases in vertical height.

8. The cleaner of claim 7 wherein a plurality of air deflecting vanes are positioned in said air passageway between the upper end of said first housing member and the inner wall of said spiral conduit.

9. The cleaner of claim 7 wherein said inner wall of said spiral conduit and the periphery of said turntable are in the same vertical plane.

References Cited

UNITED STATES PATENTS

| | | | |
|---|---|---|---|
| 177,242 | 5/1876 | Hart | 209—148 |
| 234,724 | 11/1880 | Prinz | 209—148 |
| 1,080,066 | 12/1913 | Johnston | 209—138 |
| 2,099,505 | 11/1937 | Weaver | 209—139 |
| 2,774,476 | 12/1956 | Doyle | 209—139 |
| 2,795,329 | 6/1957 | Schaub | 209—139 |
| 2,943,735 | 7/1960 | Payne | 209—144 |
| 3,036,708 | 5/1962 | Freeman | 209—146 X |
| 3,036,709 | 5/1962 | Mansson | 209—144 |
| 3,045,840 | 7/1962 | Donelson. | |
| 3,311,234 | 3/1967 | Rumpf | 209—139 X |

FOREIGN PATENTS 798,885  7/1958  Great Britain.

FRANK W. LUTTER, Primary Examiner

U.S. Cl. X.R.

209—148, 154